Jan. 2 1968     T. J. NOVESKE     3,361,967

THERMOCOUPLE RMS MEASURING CIRCUIT

Filed July 23, 1964

INVENTOR.
THOMAS J. NOVESKE
BY Williams, David,
Hoffmann & Yount
ATTORNEYS

United States Patent Office 3,361,967
Patented Jan. 2, 1968

3,361,967
THERMOCOUPLE RMS MEASURING CIRCUIT
Thomas J. Noveske, Seven Hills, Ohio, assignor to Keithley Instruments, Inc., Cleveland, Ohio, a corporation of Ohio
Filed July 23, 1964, Ser. No. 384,606
7 Claims. (Cl. 324—106)

ABSTRACT OF THE DISCLOSURE

A circuit for measuring the RMS value of an AC signal comprises an amplifier and thermocouples heated by filaments which are connected in a negative feedback loop of the amplifier. A voltmeter is connected directly across the thermocouples. The filaments and thermocouples are in an oven heated above 55° C., where the thermocouples have a more linear and more sensitive response than at normal ambient temperature. The filaments are protected against overload currents by voltage-limiting diodes and by a lamp having a voltage-resistance characteristic similar to that of the filaments.

---

This invention relates to a circuit for measuring an electric signal in which a thermocouple is used to measure the heating effect of the signal.

Thermocouples have been used in circuit arrangements for measuring the root mean square value of an alternating current signal. The thermocouples have been heated by a heating coil energized with the AC signal to be measured. In one type of known circuit the heating coil for the thermocouple has a DC current applied thereto, and the circuit arrangement is such as to maintain the heating effect of the coil constant. The AC signal is applied to the coil in addition to the direct current signal and the circuit operates to change the direct current signal to keep the heating effect constant and the change in the direct current signal is utilized as the measurement of the root mean square value of the alternating current signal.

One of the problems connected with manufacturing the known types of thermocouple root mean square meters is that of compensating the thermocouple for ambient temperature changes. Since the thermocouple is responding to temperature, changes in the ambient temperature about the thermocouple will affect the output thereof and destroy the calibration of the meter. One method used to compensate for ambient temperature changes is to provide a reference thermocouple which operates through a differential amplifier arrangement to compensate for changes in the ambient temperature. Obviously, such an arrangement requires additional gear and expense.

A further problem in connection with the production of a thermocouple meter is the fact that the RMS response of the meter varies significantly with individual thermocouples due to heater resistance variation.

A still further problem presented by thermocouple root mean square meters is that the thermocouple output is sensitive to distortions and physical changes in the heating coil therefor. The heating coils for the thermocouples are subject to distortion change in length, etc. when overloaded. Consequently, a root mean square thermocouple meter which is accurately calibrated can easily be thrown out of calibration by applying an overload current to the heating coil for the thermocouple.

In view of the foregoing it can be seen that there has been a problem in the art in providing a thermocouple root mean square meter which is not particularly sensitive to ambient temperature, to the characteristics of the particular heating coil and thermocouple, and to overloads applied to the meter.

In view of the foregoing it is the principal object of the present invention to provide a new and improved root mean square meter utilizing a thermocouple for measuring the heating effect of an alternating current signal which can be manufactured in quantity and yet be accurate and which is constructed and arranged in a manner to minimize the effects of ambient temperature.

A further object of the present invention is to provide a new and improved circuit arrangement utilizing a thermocouple for measuring the heating effect of an electric signal in which the thermocouple and the heating coil therefor to which the signal is applied are protected from changes due to ambient temperature changes by being located in an oven which is maintained at an elevated stable temperature.

A further object of the present invention is to provide a new and improved circuit arrangement for measuring the heating effect of an electrical signal and in which a thermocouple for measuring the heating effect of the signal and the heating coil therefor are disposed in an oven maintained at an elevated temperature to cause operation of the thermocouple on a steeper more linear portion of its characteristic curve.

Yet another object of the present invention is to provide a new and improved circuit arrangement for measuring the root mean square value of an alternating current signal in which the effects of the heating coil for the thermocouple on the circuit are minimized by connecting the heating coil for the thermocouple into the feedback loop of an AC amplifier.

A still further object of the present invention is to provide a new and improved circuit arrangement for measuring the root mean square value of an alternating current signal in which the heating coil or the thermocouple is protected from overload currents by diode circuits connected across the heating coils and preferably by a tungsten filament lamp connected in series with the heating coils.

In addition to the foregoing it is an object of the present invention to provide a new and improved root mean square meter for measuring an alternating current signal which is simplified as compared to meters presently used for this purpose and which can be produced in quantity and at lower cost than known meters of comparable accuracy.

Further objects and advantages of this invention will be apparent from the following detailed description of a presently-preferred embodiment thereof, which is illustrated schematically in the accompanying drawing.

Figure 1:
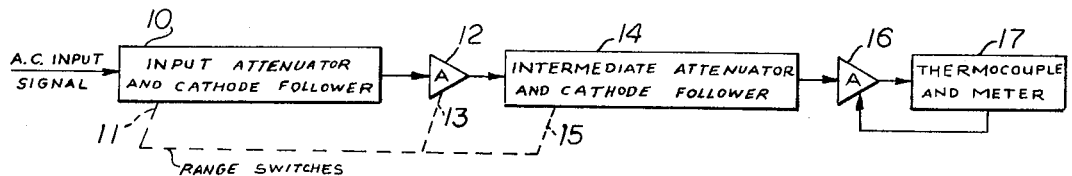
FIGURE 1 is a schematic block diagram of the complete electrical circuit which embodies the present measuring arrangement.

Referring to the complete block diagram shown in FIG. 1, the AC signal to be measured is applied to the input side of an input attenuator and cathode follower stage 10. The input attenuator portion of this stage is frequency-compensated, and its function is to reduce the amplitude of the input signal to a level at which high frequency spraying will not occur. In one practical embodiment, input signals in the 1 volt to 300 volt range are applied to the attenuator before passing to the cathode follower in this stage, while input signals within the amplitude range from 300 microvolts to 300 millivolts are applied directly to the cathode follower without attenuation. A multiple-contact range selector switch 11 in the input attenuator and cathode follower stage 10 controls the application of the input signal thereto and the particular input voltage range for which this stage is set.

The output of the cathode follower in stage 10 is shown connected to the input of an amplifier 12. However, this amplifier is bypassed except when the range switch 11 for the input attenuator and cathode follower stage 10 is at its 300 microvolt setting. For this purpose, the amplifier has a range switch 13 which is ganged to range switch 11. When the range switches are at the lowest setting (300 microvolts), the output signal from the cathode follower in stage 10 is amplified in amplifier 12. At all higher settings of the range switches, the output signal from the cathode follower in stage 10 is bypassed around amplifier 12 without being amplified thereby.

In all settings of the range switches, the output signal (whether from amplifier 12 or directly from the cathode follower in stage 10) is applied to the input of an intermediate attenuator and cathode follower stage 14. This stage includes a range selector switch 15 which is ganged to the aforementioned range switches 11 and 13, so that the attenuation in stage 14 will depend upon the voltage range setting for the particular input signal which is to be measured.

The output of stage 14 is connected to the input of an amplifier 16, which has several stages.

The output of amplifier 16 is connected to a thermocouple and meter stage 17 in accordance with the present invention. As described in detail hereinafter, part of this stage 17 is connected in a feedback loop extending between the output of amplifier 16 and an input stage of the amplifier.

Figure 2:
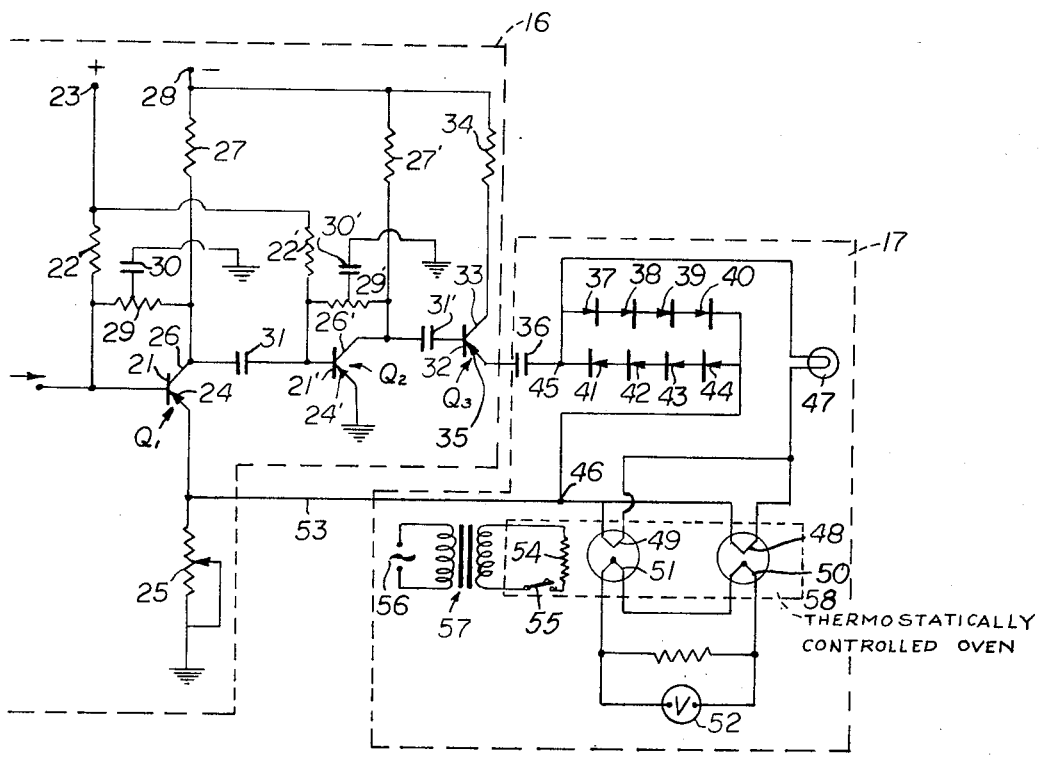
FIGURE 2 is a circuit diagram showing in more detail the final amplifier stages and the thermocouple and meter arrangement in FIG. 1.

Referring to FIGURE 2, the output stages of amplifier 16 shown schematically there include first, second and third transistors $Q_1$, $Q_2$ and $Q_3$, respectively. The signal from the preceding stage of this amplifier is applied to the base 21 of the first transistor $Q_1$. Base 21 is connected through a resistor 22 to a positive power supply terminal 23. The emitter 24 of transistor $Q_1$ is connected through an adjustable resistance 25 to ground. The collector 26 of transistor $Q_1$ is connected through a resistor 7 to a negative power supply terminal 28, and through a resistor 29 to the base 21 of this transistor. A capacitor is connected between a mid-tap on resistor 29 and ground.

In this stage of the amplifier, resistors 22, 29 and 27 constitute a bias voltage divider, which varies with the collector load voltage drop across resistor 27 and provides base voltage stabilization. Resistor 29 provides DC feedback between the collector 26 and the base 21. To lessen the effect of degeneration due to AC feedback through resistor 29 between collector 26 and base 21, the mid-tap on resistor 29 is AC-bypassed to ground through capacitor 30. The gain of this amplifier stage is adjusted by the setting of resistor 25.

The output signal from this stage is applied to the next stage in the amplifier through a capacitor 31, connected between the collector 26 and the base 21' of transistor $Q_2$ in the next stage. This next stage is essentially similar to the preceding stage and will not be described in detail, corresponding circuit elements being given the same reference numerals, with a "prime" subscript added.

The output signal from the $Q_2$ stage of the amplifier is applied through capacitor 31' to the base 32 of the third transistor $Q_3$, which operates as an emitter follower. The collector 33 of transistor $Q_3$ is connected through a resistor 34 to the negative power supply terminal 28. The emitter 35 of this transistor is connected through a capacitor 36 to a junction point 45.

It is to be understood that FIGURE 2 shows a circuit diagram of the final stages of amplifier 16 which is simplified and schematic only, with numerous circuit elements omitted for simplicity.

In the particular embodiment shown, a first set of four series-connected semiconductor diodes 37, 38, 39 and 40, having a polarity to conduct positive current from left to right in FIG. 2, and, in parallel with the first set, a second set of four series-connected diodes 41, 42, 43 and 44 of the opposite polarity, are connected between junction points 45 and 46. In one practical embodiment, the maximum voltage drop across each set of diodes is 7.5 volts. That is, these diodes insure that the voltage drop between junction points 45 and 46 does not exceed 7.5 volts.

One side of a tungsten filament lamp 47 is connected directly to the junction point 45. A pair of thermocouple heating filaments 48 and 49 are connected in parallel with each other between the opposite side of lamp 47 and the junction point 46. The heating filaments 48, 49 and the lamp 47 all have similar voltage-resistance characteristics.

A feedback line 53 connects junction point 46 to the emitter 24 of transistor $Q_1$. Accordingly, it will be apparent that the thermocouple heating filaments 48 and 49 are connected in a feedback loop of the amplifier 16.

The heating filaments 48 and 49 are in heat-transmitting relationship individually to thermocouples 50 and 51, respectively. These thermocouples are connected in series with each other directly across a DC voltmeter 52.

As is well understood, a thermocouple produces a DC output voltage which varies as the temperature to which the thermocouple is subjected. In the present circuit, each thermocouple 50 or 51 produces a DC output voltage which varies as the root mean square of the AC voltage applied to the respective heating filament 48 or 49.

In accordance with the present invention, both thermocouples 50, 51 and the respective heating filaments 48, 49 are enclosed within a thermostatically-controlled oven 58 of any suitable design. Preferably, this oven includes a housing of heat insulation material surrounding the thermocouples and heating filaments and effectively shielding them from ambient temperature changes. In the particular embodiment illustrated, the oven includes a resistance heating element 54 which is energized from a suitable AC power supply 56 through a transformer 57. This heating element maintains the interior of the oven at an elevated stable temperature, preferably at 60° C. and the current therethrough is controlled by a thermostat contact 55 connected in series with the heating coil.

Figure 3:
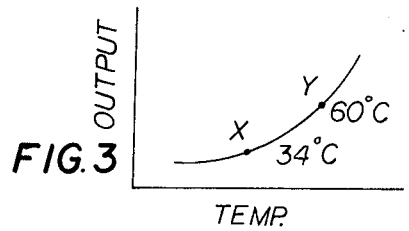
FIGURE 3 is a typical response curve for a thermocouple.

With the thermocouples in this oven, the output voltage of each thermocouple is substantially independent of variations in the ambient temperature outside the oven. Also, due to the elevated temperature established in the interior of the oven by the heater 54, each thermocouple operates on a more linear, more sensitive portion of its response curve as is shown in FIG. 3. The point X corresponds to room temperature and point Y to 60° C. That is, due to the elevated temperature maintained inside the oven, a given temperature change in the thermocouple (due to heat from the respective heating filament 48 or 49) will produce a greater change in the output voltage from that thermocouple, and that voltage change will be more linearly proportional to the temperature change which produced it, than would be the case if the ambient temperature immediately adjacent to the thermocouple were not elevated.

The overload diodes 37–44 protect the thermocouple heating filaments from overload currents which might permanently alter the response characteristics of the thermocouples and require their recalibration. These diodes insure that the voltage across junction points 45 and 46 does not exceed a desirable maximum voltage, for example, 7.5 volts.

The voltage between points 45 and 46 is divided between lamp 47 and the parallel-connected heating filaments 48, 49. The resistance of the lamp increases when overload currents are present and this increase in resistance will protect the filaments from distortion, etc. Yet the voltage resistance characteristic of the lamp is similar to that of the heating filaments and the voltage applied across the heating filaments 48, 49 will always be proportional to the total voltage between junction points 45 and 46.

Changes in the resistance of the thermocouple heating filaments 48, 49 which are connected in the feedback loop between the output and the input of the final stages of amplifier 16, produce corresponding changes in the negative feedback current to the emitter 24 of transistor $Q_1$ in this amplifier, so that the amplifier compensates for such changes in the thermocouple heating filaments.

*Operation*

In the use of the present measuring arrangement, the input signal, whose AC component is to be measured for its RMS value, is applied to the input of the input attenuator and cathode follower stage 10 in FIG. 1. Depending upon the setting of the range switches 11, 13 and 15, this signal passes through the intermediate attenuator and cathode follower stage 14 and then to the amplifier 16. After being amplified in amplifier 16, the amplified signal voltage is applied across junction points 45 and 46. As already explained, this amplified signal voltage produces a proportional voltage across the thermocouple heating filaments 48 and 49. The heating effect of these filaments on the respective thermocouples 50 and 51 produces a DC voltage across meter 52 which is proportional to the RMS value of the AC component of the amplified signal voltage applied across junction points 45 and 46. The oven 58 makes the thermocouples substantially independent of ambient temperature changes, as well as making their response more sensitive and more linear, as already explined. The overload diodes 37–44 limit the voltage across junction points 45 and 46, and the lamp 47 further reduces the voltage applied across the thermocouple heating filaments 48 and 49, so that damage cannot occur due to overload currents.

While a presently-preferred embodiment of the invention has been described in detail herein and illustrated schematically in the accompanying drawing, it is to be understood that various modifications, omissions and refinements which depart from the disclosed embodiment may be adopted without departing from the spirit and scope of this invention.

Having thus described my invention what I claim is:

1. An arrangement for measuring the heating effect of an electrical signal comprising:

thermocouple means having an output voltage versus temperature characteristic which, at a temperature substantially above normal ambient temperature, is substantially more linear and more sensitive than at normal ambient temperature;

electrically-energizable heating filament means in heat-transmitting relationship to said thermocouple means an oven enclosing said thermocouple means and said filament means to shield them from ambient temperature variations, said oven including means separate from said filament means for heating the interior thereof to a stable temperature above said normal ambient temperature to establish operation of said thermocouple means in accordance with said more linear and more sensitive output voltage versus temperature characteristic;

means for applying said signal to said heating filament means;

and means for measuring the output of said thermocouple means.

2. An arrangement for measuring the RMS value of an AC signal comprising:

a pair of thermocouples connected in series with each other and each having an output voltage versus temperature characteristic which, at a temperature substantially above normal ambient temperature, is substantially more linear and more sensitive than at normal ambient temperature;

a pair of electrically-energizable heating filaments respectively in heat-transmitting relationship to said thermocouples, said filaments being connected in parallel with each other;

an oven enclosing said thermocouples and said filaments and shielding them from ambient temperature variations, said oven including means separate from said filaments for heating the interior thereof to a stable temperature substantially above said normal ambient temperature to establish operation of each thermocouple in accordance with said more linear and more sensitive output voltage versus temperature characteristic;

means for applying the AC signal across said parallel-connected filaments;

and a voltmeter connected directly across said series-connected thermocouples to measure the output voltage generated thereby.

3. An arrangement for measuring the heating effect of an electrical signal comprising:

thermocouple means having an output voltage versus temperature characteristic which, at a temperature substantially above normal ambient temperature, is substantially more linear and more sensitive than at normal ambient temperature;

electrically energizable heating filament means in heat-transmitting relationship to said thermocouple means;

an oven enclosing said thermocouple means and said filament means and shielding them from ambient temperature changes, said oven including means separate from said filament means for heating the interior thereof to a stable temperature substantially above said normal ambient temperature to cause said thermocouple means to operate in accordance with said more linear and more sensitive output voltage versus temperature characteristic;

amplifier means having an input, an output, and a feedback loop between its output and input;

means for applying an input signal to the input of said amplifier means;

said feedback loop including means coupling the output of said amplifier means to one side of said filament means and means coupling the opposite side of said filament means and the input of said amplifier means;

and means responsive to the output of said thermocouple.

4. An arrangement for measuring the RMS value of an AC signal comprising:

thermocouple means having an output voltage versus temperature characteristic which, at a temperature substantially above normal ambient temperature, is substantially more linear and more sensitive than at normal ambient temperature;

electrically-energizable heating filament means in heat-transmitting relationship to said thermocouple means;

an oven enclosing said thermocouple means and said heating filament means and shielding them from ambient temperature variations, said oven including means separate from said filament means for heating the interior thereof to a stable temperature substantially above said normal ambient temperature to render said thermocouple means operative in accordance with said more linear and more sensitive output voltage versus temperature characteristic;

means for applying an AC signal to said heating filament means and including overload diode means to limit the amplitude of said signal so as to prevent excessive current to said heating filament means;

and a voltmeter connected across said thermocouple to measure the output voltage generated thereby in response to the input signal applied to said heating filament means.

5. An arrangement for measuring the RMS value of an AC signal comprising:

thermocouple means having an output voltage versus temperature characteristic which, at a temperature substantially above normal ambient temperature, is substantially more linear and more sensitive than at normal ambient temperature;

electrically-energizable heating filament means in heat-transmitting relationship to said thermocouple means;

an oven enclosing said thermocouple means and said heating filament means and shielding them from ambient temperature variations, said oven including means separate from said filament means for heating the interior thereof to an elevated temperature substantially above said normal ambient temperature to establish operation of said thermocouple means in accordance with said more linear and more sensitive output voltage versus temperature characteristic;

means for applying an AC signal to said heating filament means and including means for limiting the amplitude of said signal, said amplitude limiting means comprising a lamp connected in series with said heating filament means and having a voltage-resistance characteristic substantially similar to that of said heating filament means, and, in parallel with said lamp and heating filament means, a first set of series-connected diodes of one polarity and a second set of series-connected diodes of the opposite polarity connected in parallel with said first set of diodes;

and a voltmeter connected across said thermocouple means to measure the output voltage generated thereby in response to the signal applied to said heating filament means.

6. An arrangement for measuring the RMS value of an AC signal comprising:

thermocouple means having an output voltage versus temperature characteristic which, at a temperature substantially above normal ambient temperature, is substantially more linear and more sensitive than at normal ambient temperature;

electrically-energizable heating filament means in heat-transmitting relationship to said thermocouple means;

an oven enclosing said thermocouple means and said filament means and shielding them from ambient temperature changes, said oven including means separate from said filament means for heating the interior thereof to a stable temperature substantially above said normal ambient temperature to establish operation of said thermocouple means in accordance with said more linear and more sensitive output voltage versus temperature characteristic;

amplifier means having an input, an output, and a feedback loop between its output and input;

means for applying an input signal to the input of said amplifier means;

said feedback loop including means coupling the output of said amplifier means to one side of said heating filament means and including overload diode means to limit the amplitude of the current to said filament means;

said feedback loop including means connecting the opposite side of said heating filament means to the input of said amplifier means;

and a voltmeter connected across said thermocouple means to measure the output voltage generated thereby in response to the current to said heating filament means.

7. An arrangement for measuring the RMS value of an AC signal comprising:

a pair of thermocouples connected in series with each other and each having an output voltage versus temperature characteristic which, at a temperature above 55° C., is substantially more linear and more sensitive than at normal ambient temperature;

a pair of electrically energizable heating filaments respectively in heat-transmitting relationship to said thermocouples, said filaments being connected in parallel with each other;

an oven enclosing said thermocouples and said heating filaments and shielding them from ambient temperature variations, said oven including means separate from said filaments for heating the interior thereof to a stable temperature above 55° C. to cause each of said thermocouples to operate in accordance with said more linear and more sensitive output voltage versus temperature characteristic;

amplifier means having an input, an output, and a feedback loop between its output and input;

means for applying an input signal to the input of said amplifier means;

said feedback loop including means coupling the output of said amplifier means to one side of said heating filaments and including means for limiting the amplitude of the signal applied to said heating filaments, said amplitude limiting means comprising a lamp connected in series with said filaments and having a voltage-resistance characteristic substantially similar to that of said filaments and, in parallel with said lamp and filaments, a first set of series-connected diodes of one polarity and a second set of series-connected diodes of the opposite polarity connected in parallel with said first set of diodes;

said feedback loop including means connecting the opposite side of said heating filaments to the input of said amplifier means;

and a voltmeter connected directly across said series-connected thermocouples to measure the output voltage generated thereby.

References Cited

UNITED STATES PATENTS

| 1,121,834 | 12/1914 | Hiatt | 324—106 X |
|---|---|---|---|
| 1,900,082 | 3/1933 | Wallace | 324—106 |
| 1,992,022 | 2/1935 | Bedford | 324—123 |
| 2,303,845 | 12/1942 | Krasnow. | |
| 2,648,823 | 8/1953 | Kock et al. | 73—362 |
| 2,857,569 | 10/1958 | Gilbert et al. | 324—106 |
| 2,962,584 | 11/1960 | Lackoff | 325—22 |
| 3,117,241 | 1/1964 | Paynter et al. | |

FOREIGN PATENTS 218,219    3/1958    Australia.

RUDOLPH V. ROLINEC, *Primary Examiner.*

W. CARLSON, *Examiner.*

E. KARLSEN, *Assistant Examiner.*